No. 838,197. PATENTED DEC. 11, 1906.
J. J. LUCK.
MOLDING DEVICE FOR FENCE POSTS AND LIKE NON-TUBULAR ARTICLES.
APPLICATION FILED APR. 14, 1905.
2 SHEETS—SHEET 1.
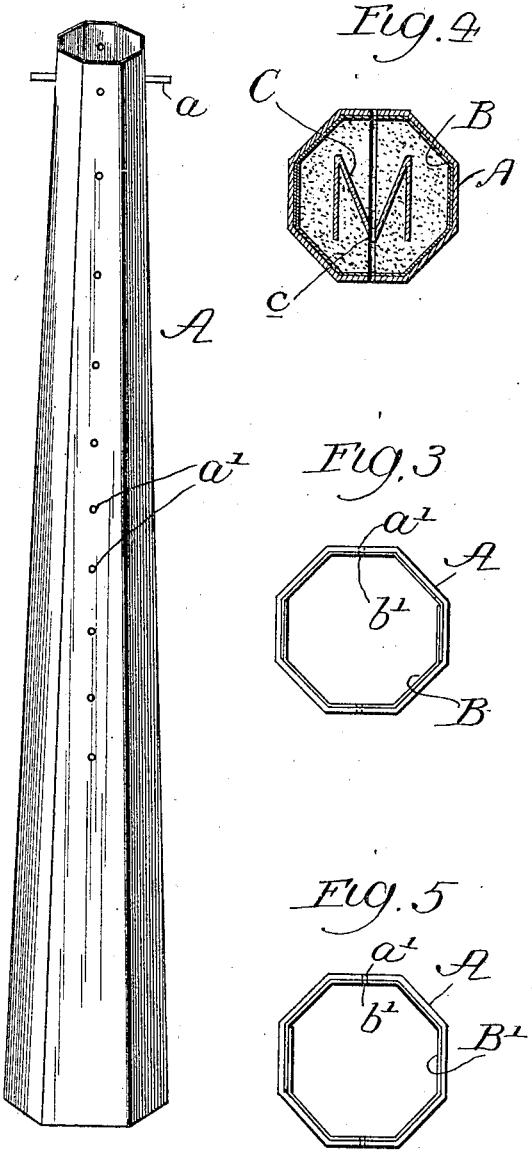

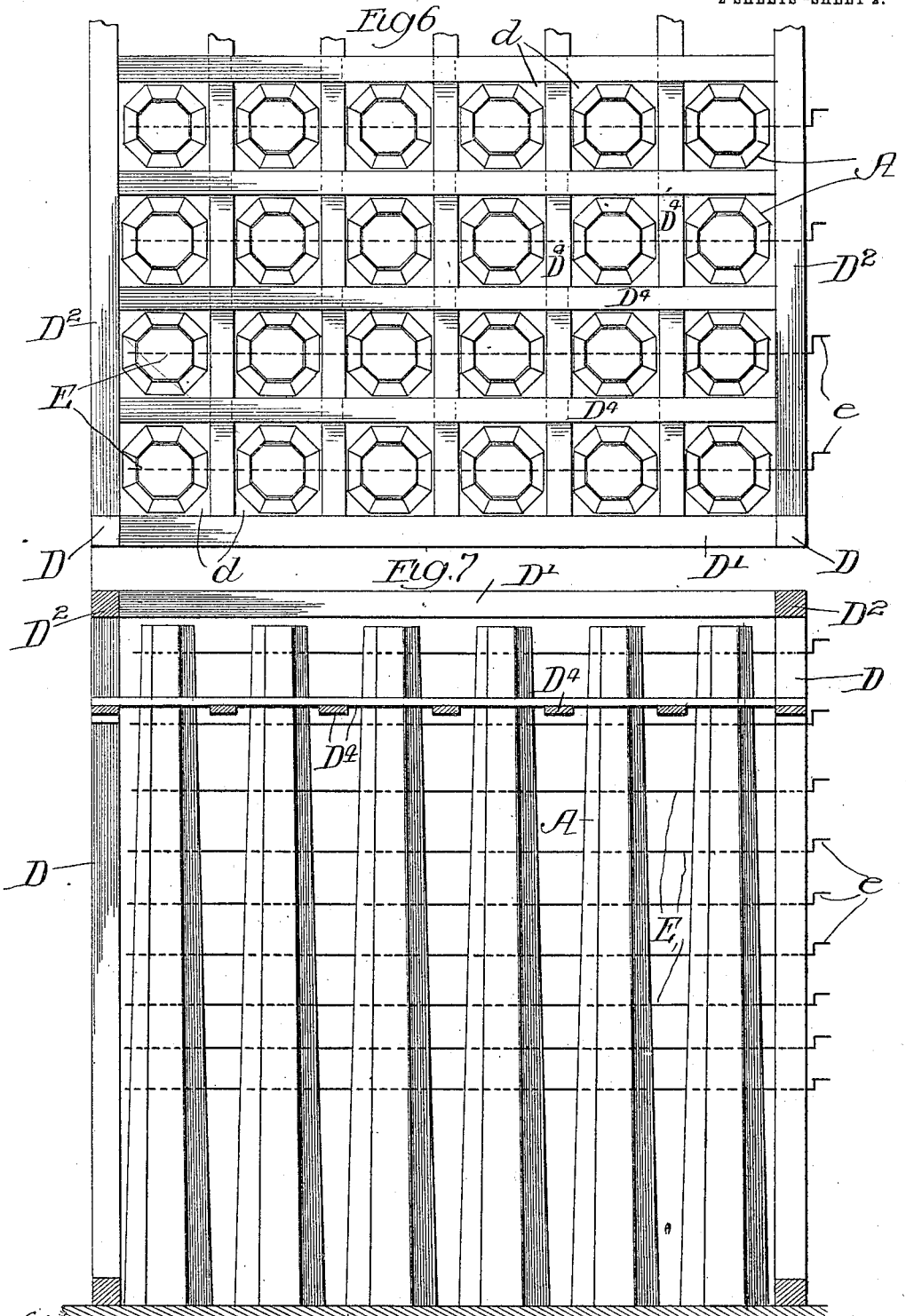

UNITED STATES PATENT OFFICE.

JOHN J. LUCK, OF AURORA, ILLINOIS.

MOLDING DEVICE FOR FENCE-POSTS AND LIKE NON-TUBULAR ARTICLES.

No. 838,197.     Specification of Letters Patent.     Patented Dec. 11, 1906.

Application filed April 14, 1905. Serial No. 255,638.

*To all whom it may concern:*

Be it known that I, JOHN J. LUCK, a citizen of the United States, residing at Aurora, in the county of Kane and State of Illinois, have invented certain new and useful Improvements in Molding Devices for Fence-Posts and Like Non-Tubular Articles; and I do hereby declare that the following is a full, clear, and exact description thereof, reference being had to the accompanying drawings, and to the letters of reference marked thereon, which form a part of this specification.

This invention relates to improvements in molding devices and apparatus for molding or forming cement fence-posts or like elongated articles which are molded or given form while in a plastic state and which subsequently harden to retain the form given thereto.

The mold is herein shown as designed for molding fence-posts; but substantially the same device or apparatus may be employed for molding railway-ties and like non-tubular or solid articles made from cement and like plastic material.

The invention relates to improvements in the mold itself and also to the apparatus in connection with which the molds are used for producing the molded articles in large quantities.

The mold herein shown embraces in general terms a two-part structure, it comprising a resilent sheet-material shell or mold member which directly receives the material to be molded and made of such form or construction as to be readily removed from the molded form after it has been set, and a confining or clamping member, herein shown as consisting of a tube or shell open at both ends, fitting over and in contact with the inner member and holds or confines the inner member in proper cross-section dimension to form the molded article of the desired cross-sectional dimension. When two tube-like members are employed, the inner member, which in this construction may be called the "lining," made be and is preferably made of lighter material than the outer or confining member. Both members are desirably made of sheet metal. The inner member, or that which directly receives the plastic material, may be made of two parts or a single part longitudinally divided throughout its length, thereby permitting it to be readily expanded when the confining member is removed, and thus facilitate its removal from the molded form when set. The molds are portable, so as to be readily handled and easily removed from the molded form when set.

The apparatus includes a suitable rack in which the molds are set upright, and the plastic material is poured into the molds while the molds are upright and hardens therein, and after the molds are removed the molded forms remain upright without rehandling until fully hardened and ready for shipment.

The invention consists in the matters hereinafter set forth, and more particularly pointed out in the appended claims.

In the drawings, Figure 1 is a perspective view of the outer or confining member of one form of my improved mold. Fig. 2 is a perspective view of the two sections constituting the inner or lining member of the mold. Fig. 3 is a cross-section taken through both mold members when assembled to constitute the complete mold. Fig. 4 is a like cross-sectional view of said parts, showing the core and plastic material in the mold. Fig. 5 is a cross-section similar to Fig. 4, illustrating a modified form of inner shell or lining. Fig. 6 is a plan view of a rack designed for supporting a number of molds during the molding operation and also for supporting the formed articles after the same have become set and the molds removed therefrom. Fig. 7 is a vertical section of the parts shown in Fig. 6.

As shown in the drawings, A and B designate, respectively, the outer and inner members of the mold. The inner member B consists, as shown in Figs. 1, 3, and 4, of two members or sections $b\ b$, fitting one within the other and adapted for overlapping engagement at their longitudinal margins. The two members of the mold are herein shown as adapted to form octagonal posts or other like articles, and the molds are therefore of octagonal cross-section. Any other desired cross-section of mold may, however, be employed while embodying the same construction and operation. The two parts of the inner member or lining B (shown in Fig. 1) overlap each other at their margins, as shown in Figs. 3 and 4, thus constituting a continuous shell, which receives the plastic material to be molded or given form.

In the construction shown in Fig. 5 the inner member or lining B' is made of a single suitably-shaped part which is longitudinally divided and the margins of which overlap when the parts of the molds are assembled. Said inner lining or member is thus split or made of two parts to facilitate the removal from the molded form of the part which has direct contact with the plastic material. In the construction shown in Fig. 1 the two parts of the inner member may be removed laterally from the molded form if conditions and the surroundings permit, or both forms of the inner member or lining may be moved endwise off the molded form when slightly expanded after removal of the outer or confining member.

The mold members are open at both ends. The lower end of the mold is closed when in use by the support on which it rests, while the material to be molded is poured into the upper open end of the mold. The two members of the mold when used for molding fence-posts will desirably be made tapering, this form facilitating the assembling and removal of the parts.

In the operation of the form of mold herein shown the inner part or lining B is first inserted into the outer part A, said parts being made to conform closely to each other. The said parts $b\ b$ being made of resilient material readily conform to each other when one is fitted within the other and the confining or clamping member is fitted thereto. In other words, the outer part or member is forced and held tightly within the inner part. By reason of the thinness of the material from which the mold members are made a substantially smooth exterior surface of the post is insured, said surface not being marked by the overlapping parts. The mold is thereafter set on end on a suitable support which closes the lower end of the same and the cement or other material, preferably in a creamlike consistency, is poured into the upper open end of the mold and allowed to remain therein until it becomes set or hardened, so as to retain its form without the support of the mold. Thereafter the outer shell or member is removed by pulling it endwise upwardly. The starting of the upward movement of the outer shell is facilitated by providing one or more lugs $a$ at the upper end of the outer member, which may be struck or tapped by a hammer or like implement. After the outer or confining member has been removed the inner member or lining may be readily expanded and removed in the manner before mentioned. When molding an article having a reinforcing-core, as the core C, (shown in Fig. 4,) the core is placed in the mold before the material is poured therein and is held centrally in the mold during the pouring operation in any suitable manner.

The function of the outer member or shell A is that of a clamping or confining member to act on the overlapping margins of the mold member proper substantially throughout the length of said overlapping margins in a manner to press or hold them together throughout the length of the mold. This construction makes it practicable to use relatively thin sheet metal for the mold proper, while avoiding danger of the plastic material escaping through the joints between the overlapping parts of said mold members. This function of the clamping member may obviously be effected by a device differing in its construction from that herein shown.

In Figs. 6 and 7 I have shown a rack for supporting the molds and the molded forms when the molds have been removed when making fence-posts or like articles in large quantities. In the manufacture of such articles it is necessary during the hardening process, which consumes considerable time, to wet the articles from time to time by spraying water thereover. I have provided an improved device for holding the molds in proper position relatively to each other during such operations. Said rack comprises in general terms vertical corner-posts D D, joined at their upper ends by suitable connecting-bars $D'\ D^2$ and supported on and connected at their lower ends to a flat platform or floor $D^3$, upon which the molds and posts are supported in upright positions. Extending between and attached to the upper connecting-bars are a plurality of intersecting bars $D^4$, arranged to constitute pockets $d$, which receive the molds preparatory to the molding operation and in which the molded articles are supported when the molds are removed therefrom. Said molds are dropped downwardly into said pockets from above upon the platform or floor $D^3$ prior to the molding operation. After the plastic material is poured into the molds and harden the molds are removed and the formed articles, as the fence-posts in the instance shown, are allowed to remain in the rack during the subsequent hardening process. During such operation all parts of the molded or formed articles are freely exposed for sprinkling as occasion requires. Furthermore, the molded articles are located to permit the free passage of air thereover. It will thus be observed that the operation of drawing the molds from the molded articles and subsequently wetting the posts during the hardening operation is effected without any handling of the molded articles whatever, the only handling of such articles being that necessary to remove the same from the rack.

When manufacturing fence-posts of this character, it is necessary to provide some means for attaching thereto fasteners by which wires or boards may be attached to the posts. In the present instance the posts are shown as provided with through-holes in which are adapted to be fitted fastening devices. In connection with the rack illustrated for manufacturing fence-posts in large quantities I have shown a novel method of forming said holes. Said method consists in providing the inner and outer members of the mold and also the core C, when a core is employed, with apertures $a'$, $b'$, and $c$, respectively, which register when the members of the molds are assembled and the cores are in position therein. When setting the molds in the rack preparatory to pouring the material therein, the said openings are brought in alinement with each other, and while in this position and before the pouring occurs a plurality of rods E are inserted through the several registering apertures of the molds and cores of each row of molds, as shown in Figs. 6 and 7. Said rods remain in the posts during the pouring operation and until the same are partially hardened, and just before the same are set the rods are turned, as by the use of cranks $e$ at the outer end thereof, thereby forming permanent holes in the post which extend therethrough.

Changes may be made in details of construction of the invention herein described without departing from the spirit and scope thereof, and I do not wish to be limited to the structural details except as hereinafter made the subject of specific claims.

I claim as my invention—

1. A mold for molding fence-posts and like elongated articles from plastic material comprising an upright, tubular mold member which is open at both ends and receives the plastic material through the upper open end of the mold, and is closed at its lower end by the unattached support upon which it rests, said mold member being made of thin, resilient sheet material and longitudinally cut or divided and the divided margins of which are adapted to fit one within the other in overlapping relation throughout the length of the mold, and clamping or confining means constructed to press said overlapping margins together substantially throughout the length of the mold.

2. A mold for molding fence-posts and like solid or non-tubular, elongated articles from plastic material comprising an upright, tubular mold member which is open at both ends and receives the plastic material through the upper open end of the mold, said mold member being made of thin resilient sheet material and longitudinally cut or divided and overlapping at its divided margins throughout the length of the mold, and an elongated tubular confining or clamping member which is slipped endwise over said mold member and holds the same in proper cross-sectional dimension.

3. A mold for molding fence-posts and like elongated articles from plastic material comprising an upright, tubular mold member open at both ends and adapted to be closed at its lower end by the surface upon which it is removably supported and to receive the plastic material through its open upper end, said mold member consisting of two longitudinally-separable, complementally-fitted, resilient, sheet-material members, one of which fits at its longitudinal margins partially within the other in overlapping relation, and means acting on the overlapping margins of said members to press said margins together throughout the length of the mold.

4. A mold for molding fence-posts and like solid or non-tubular, elongated articles from plastic material comprising an upright, tubular mold member open at both ends and adapted to be closed at its lower end by the surface upon which it is removably supported and to receive plastic material through its open upper end, said mold member consisting of two longitudinally-separable, complementally-fitted, resilient, sheet-material members, one of which fits in overlapping relation partially within the other at its longitudinal margins throughout the length of the mold, and a confining member coextensive with the mold members for holding in proper cross-sectional dimension said mold.

5. A mold for molding fence-posts and like elongated solid articles from plastic material, comprising an upright, upwardly-tapered, tubular, sheet-metal mold member open at both ends, which receives the plastic material through its upper open end, and is closed at its lower end by the surface upon which it is removably supported, said mold member comprising two longitudinally-separable members, one of which fits partially within the other in overlapping relation at its longitudinal margins, and a tapered clamping member coextensive with and engaging the mold member to hold it in proper cross-sectional dimension, said clamping member being removable endwise from the mold member to permit the latter to expand and to be removed from the molded form.

6. A mold for molding fence-posts or other elongated articles from plastic material, comprising an upright tubular mold member which receives the plastic material and is open at both ends and longitudinally divided, and a tubular confining member adapted to receive and hold in proper cross-sectional dimension the receiving mold member during the pouring operation, said outer member being adapted to be removed endwise from the inner member to permit the latter to expand and to be removed from the molded form, and the outer member being provided at its upper end with a lug designed to be tapped to start the outer member off the inner member.

7. A mold for molding fence-posts and the like from plastic material, comprising an upright, tubular mold member open at both ends and longitudinally cut or divided, and a confining member for holding the mold member in operative position, the mold member being provided at its opposite sides with registering apertures, and the confining member being provided with correspondingly-located apertures.

8. A mold for molding fence-posts or other elongated articles from plastic material, comprising an upright tubular mold member which receives the plastic material, and is open at both ends and longitudinally divided, and a tubular confining member adapted to receive and hold in proper cross-sectional dimensions the receiving mold member during the pouring operation, said outer member being adapted to be removed endwise from the inner member to permit the latter to expand and to be removed from the molded form, said inner and outer members being provided with transverse registering apertures designed to be brought into registration when the members are assembled.

9. A mold for molding fence-posts and other elongated articles from plastic material, comprising an upright tubular mold, open at both ends, and longitudinally divided, and means for confining said mold member in proper cross-sectional dimension during the pouring operation, said mold member being provided with a plurality of vertically-separated apertures.

10. A molding apparatus for making cement fence-posts and like elongated articles comprising a rack consisting of a floor or platform, and a plurality of rows of parallel pockets supported on said floor and a plurality of molds open at both ends and adapted to rest upon and to be closed at their lower ends by said floor, said molds being supported upright by the side walls of said pockets and constructed to be moved upwardly away from the molded forms.

11. A molding apparatus for making cement fence-posts and like elongated articles, comprising a rack consisting of a floor and a plurality of rows of pockets located thereover, and a plurality of molds open at both ends and adapted to rest upon and be closed at their lower ends by said floor, said molds being supported upright by said pockets and each provided with a plurality of vertically-separated apertures.

12. A molding apparatus for making cement fence-posts and like articles comprising a rack consisting of a floor or platform and a plurality of rows of parallel pockets above said floor, and a plurality of molds open at both ends resting on and closed at their lower ends by said floor, said molds being held in upright position in said pockets, the molds of each row being provided with a plurality of vertically-separated registering apertures and a plurality of vertically-separated rods adapted to be extended through the apertures of the molds of each row.

In testimony that I claim the foregoing as my invention I affix my signature, in presence of two witnesses, this 10th day of April, A. D. 1905.

JOHN J. LUCK.

Witnesses:
J. F. IMES,
J. A. RILEY.